United States Patent
Martin

(10) Patent No.: US 10,005,548 B2
(45) Date of Patent: Jun. 26, 2018

(54) COMPLIANT LOWER BEARING WITH TAPERED OUTER DIAMETER

(71) Applicant: Goodrich Corporation, Charlotte, NC (US)

(72) Inventor: Dennis W. Martin, Woodinville, WA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days. days.

(21) Appl. No.: 15/366,531

(22) Filed: Dec. 1, 2016

(65) Prior Publication Data

US 2017/0081023 A1    Mar. 23, 2017

Related U.S. Application Data

(62) Division of application No. 14/460,757, filed on Aug. 15, 2014, now Pat. No. 9,540,099.

(51) Int. Cl.
   *F16C 29/02*    (2006.01)
   *F16C 33/04*    (2006.01)
   (Continued)

(52) U.S. Cl.
   CPC .............. *B64C 25/60* (2013.01); *B64C 25/62* (2013.01); *F16C 29/001* (2013.01);
   (Continued)

(58) Field of Classification Search
   CPC ....... F16C 29/001–29/002; F16C 29/02; F16C 33/04; F16C 27/063; F16C 34/04;
   (Continued)

(56) References Cited

U.S. PATENT DOCUMENTS 3,163,475 A    12/1964  Litsky
3,578,828 A *  5/1971   Orkin ...................... F16C 17/10
                                                          384/129
(Continued)

FOREIGN PATENT DOCUMENTS

DE    3613123    10/1987
EP    2210811     7/2010
(Continued)

OTHER PUBLICATIONS

EPO; European Search Report dated Jan. 20, 2016 in EP Application No. 15180505.
(Continued)

*Primary Examiner* — Marcus Charles
(74) *Attorney, Agent, or Firm* — Snell & Wilmer, L.L.P.

(57) ABSTRACT

A strut assembly includes a piston and a bearing housing around the piston. The bearing housing may also comprise a groove and a tapered surface opposite the groove. A bearing may be in the groove and proximate the piston. An outer cylinder may be around the bearing housing. The angle of the tapered surface may be based on a deflection angle between the outer cylinder and the piston. A wear plate may be around the tapered surface. An elastic material may be disposed between the tapered surface and the wear plate. The bearing housing may comprise a titanium alloy. The bearing housing may be configured to flex towards the wear plate.

7 Claims, 4 Drawing Sheets

(51) Int. Cl.
*B64C 25/60* (2006.01)
*F16C 29/00* (2006.01)
*B64C 25/62* (2006.01)

(52) U.S. Cl.
CPC ............ *F16C 29/002* (2013.01); *F16C 29/02* (2013.01); *F16C 33/04* (2013.01); *F16C 2326/05* (2013.01); *F16C 2326/43* (2013.01)

(58) Field of Classification Search
CPC ........ B64C 25/60; B64C 25/62; F16F 1/3935; B60B 2204/1484
USPC ............. 384/32, 38, 95, 129, 276, 282, 290; 267/125, 141.7, 267, 141.3
See application file for complete search history.

(56) References Cited

U.S. PATENT DOCUMENTS

| | | | |
|---|---|---|---|
| 5,028,163 A | | 7/1991 | Krieg et al. |
| 5,096,075 A | * | 3/1992 | Glover .................... B61G 7/10 213/61 |
| 5,267,840 A | * | 12/1993 | Snow ...................... F04C 15/06 417/310 |
| 5,397,184 A | * | 3/1995 | Murai ................. F16C 32/0603 384/107 |
| 5,902,050 A | | 5/1999 | Balczun et al. |
| 5,967,668 A | | 10/1999 | Germano |
| 5,993,065 A | | 11/1999 | Ladzinski et al. |
| 6,012,847 A | | 1/2000 | Kahle |
| 6,146,045 A | * | 11/2000 | Maughan ................. F16D 1/12 280/93.508 |
| 7,448,478 B2 | | 11/2008 | Thomas |
| 8,083,598 B2 | * | 12/2011 | Yamamoto ............. B60B 27/00 384/544 |
| 8,342,769 B2 | * | 1/2013 | Elterman ............... B62D 7/166 403/136 |
| 8,636,414 B1 | * | 1/2014 | Van Dyke ........... B60B 27/0026 384/129 |
| 8,647,010 B2 | | 2/2014 | Losche et al. |
| 9,834,038 B2 | * | 12/2017 | Chung .................. B60B 35/125 |
| 2003/0047414 A1 | * | 3/2003 | Henson .................. B65G 39/09 193/35 R |
| 2003/0098565 A1 | | 5/2003 | Mosler |
| 2004/0022464 A1 | | 2/2004 | Schinazi et al. |
| 2008/0096715 A1 | * | 4/2008 | Ono .................... F16H 57/0483 475/160 |
| 2009/0272833 A1 | * | 11/2009 | Wahl ...................... B60R 22/40 242/384.2 |
| 2011/0274382 A1 | | 11/2011 | Berns et al. |
| 2012/0306173 A1 | * | 12/2012 | Meitinger .............. B60G 7/006 280/86.751 |

FOREIGN PATENT DOCUMENTS

| | | |
|---|---|---|
| GB | 999492 | 7/1965 |
| GB | 1173051 | 12/1969 |

OTHER PUBLICATIONS office Action with Restriction Requirement dated Mar. 22, 2016 for U.S. Appl. No. 14/460,757.
Non-Final Office Action dated Jun. 16, 2016 in U.S. Appl. No. 14/670,757.
Notice of Allowance dated Oct. 24, 2016 in U.S. Appl. No. 14/670,757.

* cited by examiner

COMPLIANT LOWER BEARING WITH TAPERED OUTER DIAMETER

CROSS-REFERENCE TO RELATED APPLICATIONS

This application claims priority to, and is a U.S. Divisional Application of U.S. patent application Ser. No. 14/460,757, filed Aug. 15, 2014 and entitled "COMPLIANT LOWER BEARING WITH TAPERED OUTER DIAMETER," which is hereby incorporated by reference in its entirety

FIELD OF INVENTION

The present disclosure relates to landing gear, and, more specifically, to a lower bearing for use in a strut assembly for landing gear.

BACKGROUND OF THE INVENTION

Aircraft landing gear may rely on strut assemblies to provide a smooth ride over runways and support during loading. The strut assemblies may include a bearing to smooth operation of the piston and housing. In some instances, the landing gear may be at an angle relative to the ground while bearing the weight of the aircraft. Under load, the piston may deflect relative to the outer cylinder and put increased pressure at an end of the bearing. The pressure increase can cause stick slip in cantilevered shock struts. Stick slip may present a dangerous condition under which the aircraft may suddenly shift as the strut unsticks. Stick slip may be particularly dangerous when aircraft are being loaded or unloaded.

SUMMARY OF THE INVENTION

A bearing housing may comprise a cylindrical body and a groove formed in an inner surface of the cylindrical body. The groove may be configured to interface with a bearing. A tapered surface may be formed on an outer diameter of the cylindrical body.

In various embodiments, a wear plate may be disposed over the tapered surface. An elastic material may be between the tapered surface and the wear plate. The tapered surface may be conical. A length of the tapered surface may be less than half the length of the bearing housing. The tapered surface may be tapered at an angle based on a deflection angle of the piston. A second tapered surface may be formed on the outer diameter of the cylindrical body. An elastic material may be between the second tapered surface and the wear plate.

A strut assembly may comprise a piston and a bearing housing around the piston. The bearing housing may also comprise a groove and a tapered surface opposite the groove. A bearing may be in the groove and proximate the piston. An outer cylinder may be around the bearing housing.

In various embodiments, an angle of the tapered surface may be based on a deflection angle between the outer cylinder and the piston. A wear plate may be around the tapered surface. An elastic material may be disposed between the tapered surface and the wear plate. The bearing housing may comprise a titanium alloy. The bearing housing may be configured to flex towards the wear plate. The bearing housing may further include a second tapered surface opposite the groove.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
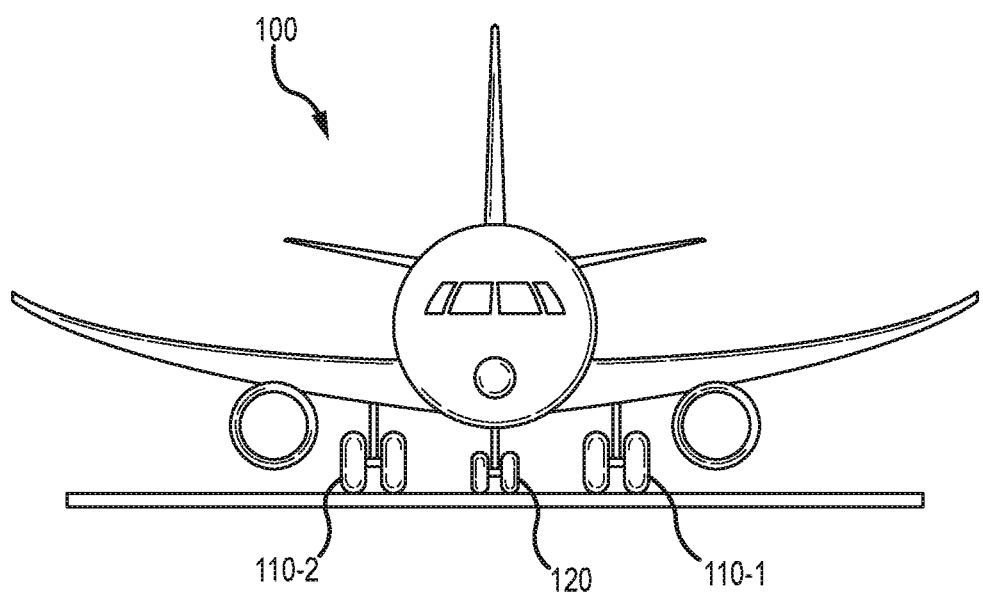
FIG. 1 illustrates an aircraft on the ground, in accordance with various embodiments.

In various embodiments and with reference to FIG. 1, an aircraft 100 may comprise a landing gear system including a first main landing gear 110-1, a second main landing gear 110-2, and a nose landing gear 120. Nose landing gear 120 may be installed in a forward portion of the aircraft fuselage (e.g., forward of the engines) at the nose of the fuselage. First main landing gear 110-1 and second main landing gear 110-2 may be installed aft of nose landing gear 120. First main landing gear 110-1, second main landing gear 110-2, and nose landing gear 120 may generally support the aircraft when it is not flying, allowing the aircraft to take off, land, and taxi without damage.

Figure 2:
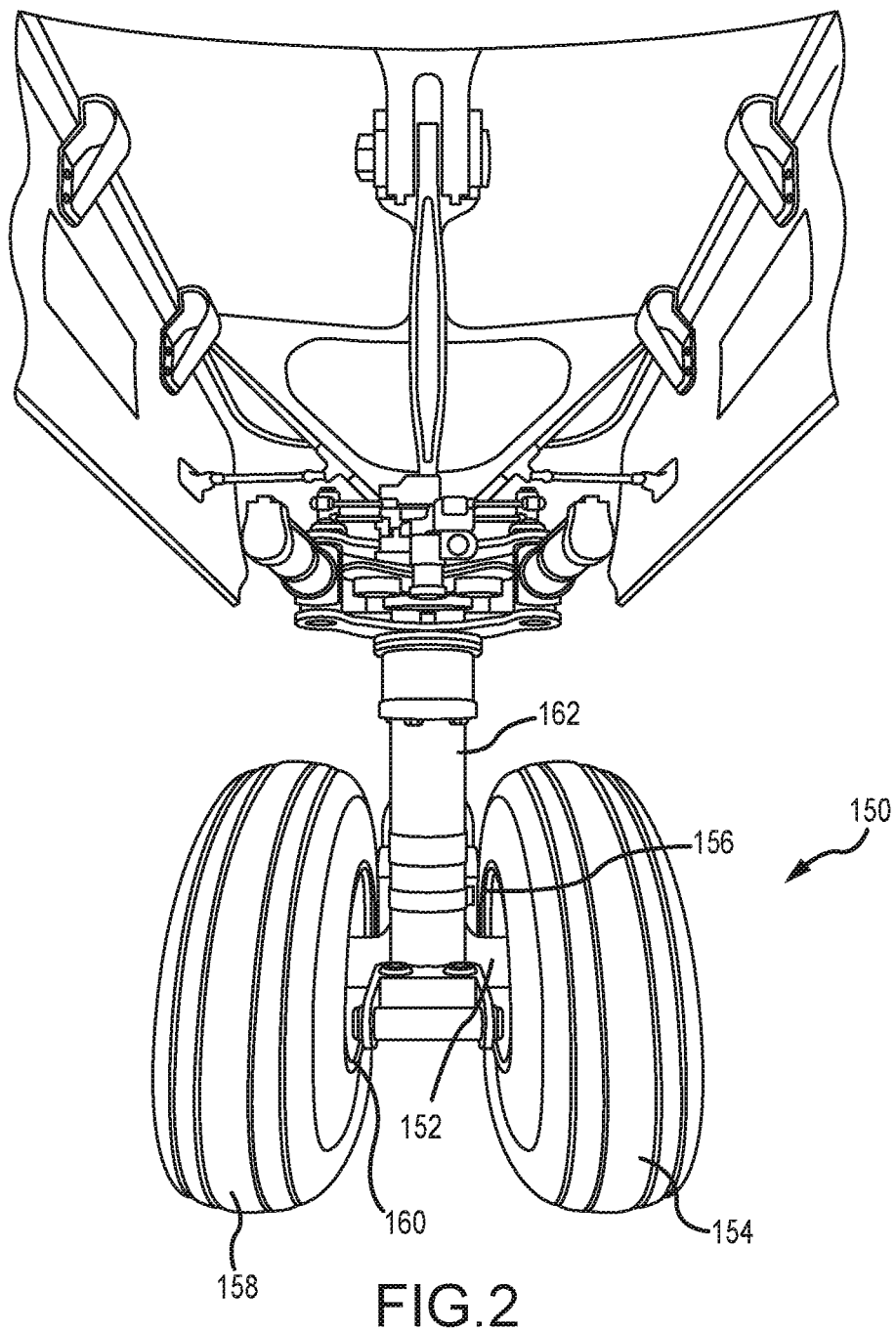
FIG. 2 illustrates a landing gear assembly, in accordance with various embodiments.

In various embodiments and with reference to FIG. 2, nose landing gear 150 may comprise a first wheel 156 and a second wheel 160 coupled to landing gear strut 162. First wheel 156 may be operatively coupled to a tire 154. In this regard, tire 154 may be mounted on first wheel 156. Tire 154 may define a pressurizable chamber between tire 154 and first wheel 156. Similarly, a tire 158 may be mounted on and/or coupled to second wheel 160. First wheel 156 and second wheel 160 may operatively couple to and/or rotatably couple to an axle assembly 152. Axle assembly 152 may operatively couple to landing gear strut 162.

Figure 3:
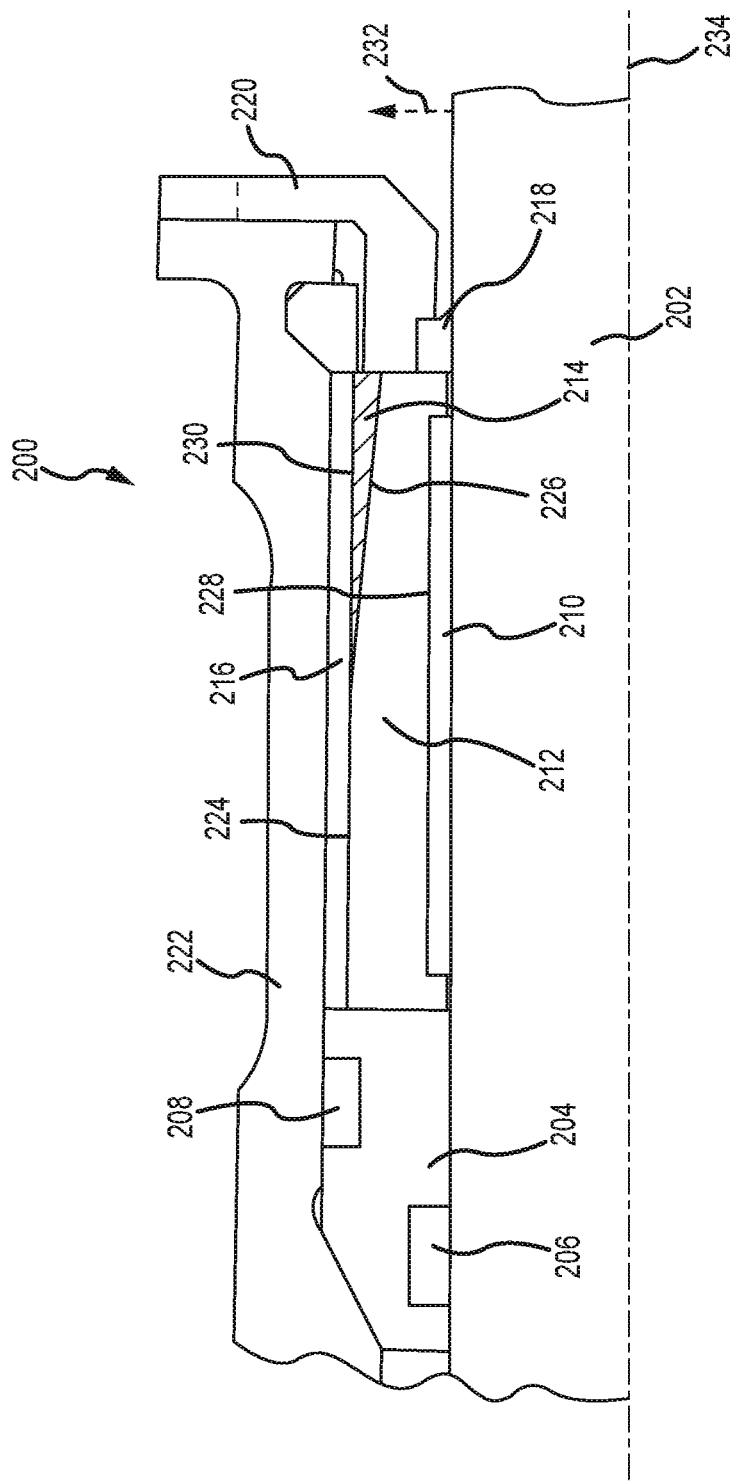
FIG. 3 illustrates a partial cross sectional view of a strut assembly with a tapered bearing housing, in accordance with various embodiments.

FIG. 3 illustrates a partial cross sectional view of a strut assembly 200 with a tapered bearing housing, in accordance with various embodiments. Strut assembly 200 may include piston 202 about axis 234 projecting axially beyond an edge of outer cylinder 222 and end cap 220. Outer cylinder 222 may be made from metals such as steel, for example. Bearing 210 may slideably engage piston 202 on the radially inner surface of bearing 210. Bearing housing 212 may press against end cap 220 in an axial direction between an end of bearing 210 and end cap 220. Scraper 218 is adjacent bearing 210 in an axial direction and scrapes piston 202 to prevent dust and debris from reaching between bearing 10 and piston 202 as bearing 210 slides against piston 202. Hydraulic seal carrier 204 may include dynamic seal 206 against piston 202. Piston 202 may move in an axial direction relative to dynamic seal 206. Hydraulic seal carrier 204 may further include static seal 208 against outer cylinder 222 and thus the static seal 208 may be restrained from motion relative to outer cylinder 222.

In various embodiments, bearing housing 212 includes a cylindrical body with groove 228 on a radially inner surface and tapered surface 226 opposite groove 228 along an outer diameter of the cylindrical body. Bearing housing 212 may be axially symmetric around axis 234. Bearing 210 may be fitted into groove 228 of bearing housing 212. Tapered surface 226 may be angled with respect to surface 224 that is adjacent tapered surface 226. Surface 224 may press against wear plate 216. Tapered surface 226 extends at least partially radially inward at points of tapered surface 226 axially further away from surface 224. Tapered surface 226 may create a gap between tapered surface 226 and wear plate 216 at the axial end of bearing housing 212. Thus, the gap between inner surface 230 of wear plate 216 and tapered surface 226 of bearing housing 212 may be widest at an end of bearing housing 212.

In various embodiments not having wear plate 216, tapered surface 226 may be angled with respect to outer cylinder 222. Tapered surface 226 may be conical, convex, concave, stepped, or any other suitable shape to provide a gap between wear plate 216 and tapered surface 226. The length of tapered surface 226 may be less than or equal to half the length of bearing housing 212. In various embodiments, tapered surface 226 may cover the entire outer diameter of bearing housing 212. Tapered surface 226 may have an angle with respect to wear plate 216 based on the deflection of the strut relative to the outer cylinder in direction 232 when strut assembly 200 is under load.

Tapered surface 226 may be formed around the outer diameter of bearing housing 212. Elastic material 214 over tapered surface 226 may keep the gap between wear plate 216 and tapered surface 226 clean and free from debris. Bearing housing 212 and wear plate 216 may be made from a metal such as stainless steel and/or a titanium alloy, for example.

In various embodiments, tapered surface 226 tends to reduce sticking between bearing and piston under load by allowing for deflection of piston 202 relative to outer cylinder 222 without substantially increasing pressure between bearing housing 212 and outer cylinder 222. Piston 202 may flex and deflect relative to outer cylinder 222, pressing bearing housing 212 towards wear plate 216. Tapered surface 226 may press closer to wear plate 216, and elastic material 214 may compress as piston 202 deflects relative to outer cylinder 222. Elastic material 214 may compress between radially inner surface 230 of wear plate 216 and tapered surface 226 of bearing housing 212. Bearing housing 212 may flex to reduce the gap between wear plate 216 and tapered surface as bearing housing 212 is pressed against outer cylinder 222 in response to deflection of piston 202. Wear plate 216 reduces burnishing of outer cylinder as bearing housing 212 deflects under load. Bearing housing 212 with tapered surface 226 may relieve pressure between piston 202 and bearing 210 as strut assembly 200 is loaded when compared to a flat bearing housing. Thus, bearing housing 212 tends to reduce wear and tear on strut assembly 200 by limiting point contact loads on the piston and reduce burnishing of the outer cylinder, for example.

Figure 4:
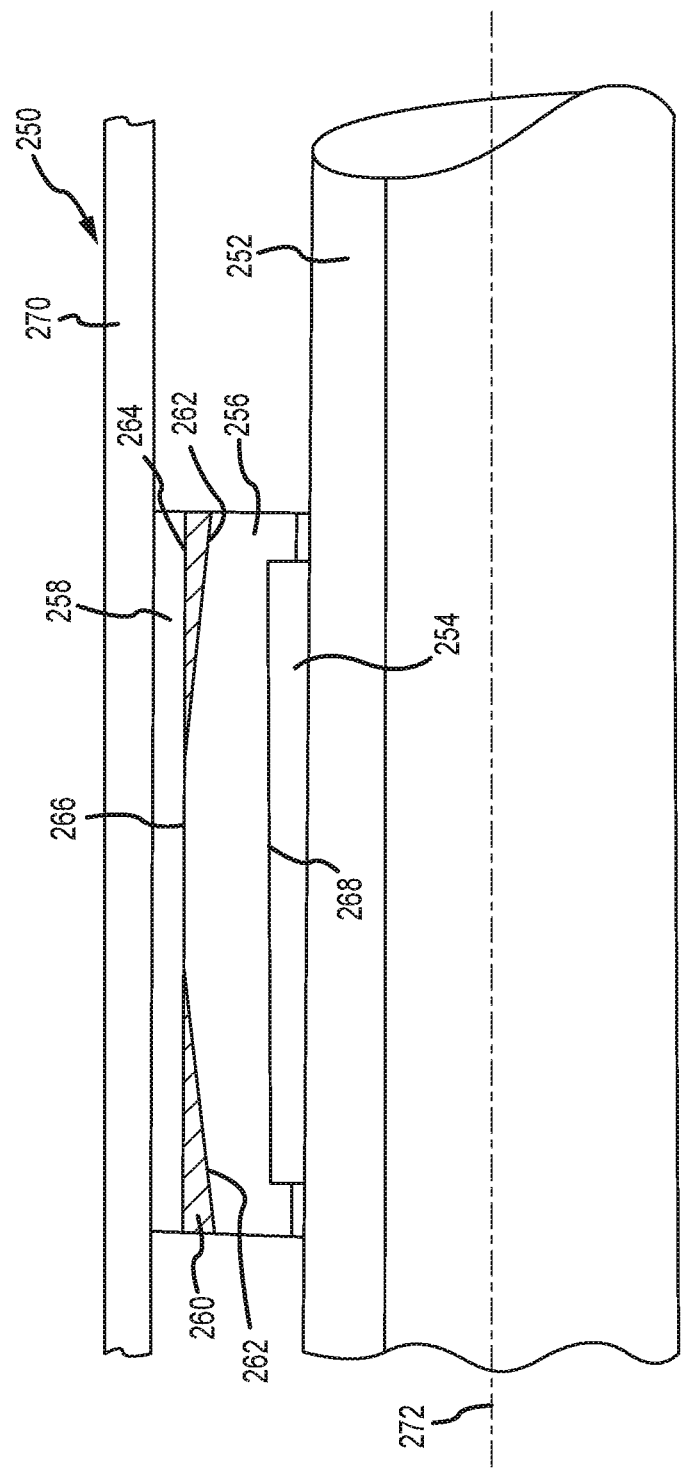
FIG. 4 illustrates a partial cross sectional view of a strut assembly with a tapered bearing housing, in accordance with various embodiments.

FIG. 4 illustrates a partial cross sectional view of a strut assembly 250 with a tapered bearing housing, in accordance with various embodiments. Strut assembly 250 includes piston 252 with axis 272 and bearing 254. Piston 252 may be symmetric around axis 272. Bearing housing 256 may also be axially symmetric around axis 272. Bearing housing 256 may have wear plate 258 radial, outward from bearing housing 256 and pressing against flat surface 266 of bearing housing 256. Elastic material 260 may be between wear plate 258 and tapered surfaces 262 of bearing housing 256. Inner surface 264 of wear plate 258 may be opposite and radially outward from tapered surfaces 262 of bearing housing 256. Tapered surfaces 262 may be conical, cylindrical, convex, concave, stepped, or any other suitable shape to provide a gap between wear plate 258 and tapered surface 262. Bearing housing 256 may have similar tapered surfaces 262 on both sides of flat surface 266. Flat surface 266 of bearing housing 256 may press against inner surface 264 of wear plate 258. In various embodiments not having wear plate 258, flat surface 266 may press against outer cylinder 270.

In various embodiments, bearing housing 256 includes groove 268 on an inner diameter or radially inward facing side and tapered surface 262 opposite groove 268 on an outer diameter or radially outward facing side of bearing housing 256. Bearing housing 256 and wear plate 258 may be made from a metal such as stainless steel and/or a titanium alloy, for example. Tapered surface 262 is angled with respect to flat surface 266 that presses against wear plate 258. Tapered surface 262 has an angle with respect to wear plate 258 based on the deflection of piston 252 relative to outer cylinder 270 in response to strut assembly 250 being under load. Elastic material 260 may be between inner surface 264 of wear plate 258 and tapered surfaces 262 of bearing housing 256. The disposition of elastic material 260 over tapered surface 262 helps keep the gap between wear plate 258 and tapered surface 262 clean and free from debris.

In various embodiments, tapered surface 262 may reduce sticking between bearing 254 and piston 252 under load by allowing for deflection of piston 252 relative to outer cylinder 270 with less pressure increase against edges of bearing 254. Piston 252 may flex and deflect relative to outer cylinder 270 and press bearing housing 256 towards wear plate 258. Tapered surface 262 may be pushed closer to wear plate 258, and elastic material 260 may compress as piston 252 deflects relative to outer cylinder 270. Bearing housing 256 may flex to reduce the gap between wear plate 258 and tapered surface 262 as bearing housing 256 is pressed against the outer cylinder 270. Wear plate 258 may relieve pressure between the outer cylinder 270 and bearing housing 256 when strut assembly 250 is loaded. Thus, wear plate 258 tends to reduce wear and tear on strut assembly 250 such as burnishing outer cylinder 270, for example.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bearing housing, comprising:
   a cylindrical body;
   a groove forming in an inner surface of the cylindrical body configured to interface with a bearing;
   a tapered surface formed on an outer diameter of the cylindrical body; and
   a wear plate, wherein the cylindrical body is in contact with the wear plate and the tapered surface creates a gap between the cylindrical body and the wear plate.

2. The bearing housing of claim 1, further comprising an elastic material between the tapered surface and the wear plate.

3. The bearing housing of claim 1, wherein the tapered surface is conical.

4. The bearing housing of claim 3, wherein a length of the tapered surface is less than half a length of the bearing housing.

5. The bearing housing of claim 3, wherein the tapered surface is tapered at an angle based on a deflection angle of a piston.

6. The bearing housing of claim 1, further including a second tapered surface formed on the outer diameter of the cylindrical body.

7. The bearing housing of claim 6, further including an elastic material between the second tapered surface and the wear plate.

* * * * *